(12) United States Patent
Lee

(10) Patent No.: US 11,692,516 B1
(45) Date of Patent: Jul. 4, 2023

(54) QUANTUM KINETIC INJECTOR

(71) Applicant: McKane B. Lee, Arlington, WA (US)

(72) Inventor: McKane B. Lee, Arlington, WA (US)

( * ) Notice: Subject to any disclaimer, the term of this patent is extended or adjusted under 35 U.S.C. 154(b) by 0 days.

(21) Appl. No.: 17/741,747

(22) Filed: May 11, 2022

(51) Int. Cl.
*F02M 25/022* (2006.01)
*F02M 21/02* (2006.01)

(52) U.S. Cl.
CPC .... *F02M 25/0224* (2013.01); *F02M 21/0254* (2013.01); *F02M 21/0296* (2013.01); *F02M 25/0225* (2013.01); *F02M 25/0228* (2013.01); *F02M 2200/9053* (2013.01)

(58) Field of Classification Search
CPC ....... F02M 2200/9053; F02M 25/0228; F02M 25/0225; F02M 21/0296; F02M 21/0254; F02M 25/0224
See application file for complete search history.

(56) References Cited

U.S. PATENT DOCUMENTS

2007/0080071 A1* 4/2007 Perry ................. F02D 19/0671
205/639
2021/0270171 A1* 9/2021 Johnson ............... B01F 25/103

FOREIGN PATENT DOCUMENTS

WO    WO-2006001855 A2 *  1/2006  ............ F01N 1/088

\* cited by examiner

*Primary Examiner* — Kevin A Lathers
(74) *Attorney, Agent, or Firm* — Emerson, Thomson & Bennett, LLC; Roger D. Emerson

(57) ABSTRACT

An electrolysis system includes an injector with a conical tapered resonant capacitor wave-guide forming two voltage zones of polarity. An anode probe establishes a positive charge reaction of a capacitive voltage region. An anode exciter component has a conically tapered tip with a tapering diameter that diminishes toward a tip end and determines a guide path through the injector for a dielectric medium. A cathode probe is retained within the anode probe for establishing a negative charge reaction of the capacitive voltage region. A cathode exciter component includes a cathode tapered tip conically parallel with the anode conically tapered tip. The anode and cathode end portions form a compression exiting nozzle port. The compression exiting nozzle port receives a mixture of water mist and fuel gases to focus the mixture into a trigger zone of fuel gas combustion, which triggers an electrolysis reaction in the water mist.

5 Claims, 23 Drawing Sheets

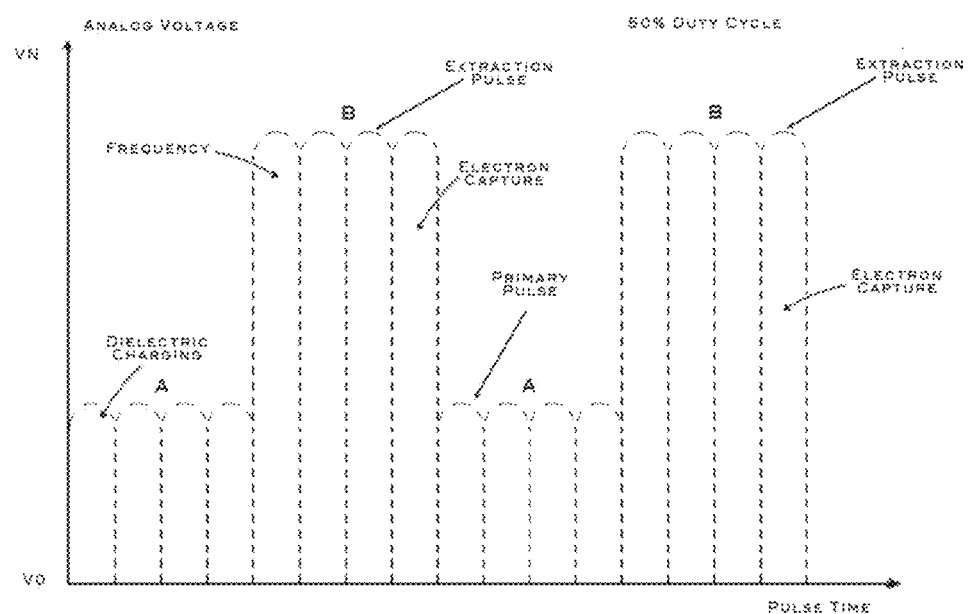
FIG. 7A1

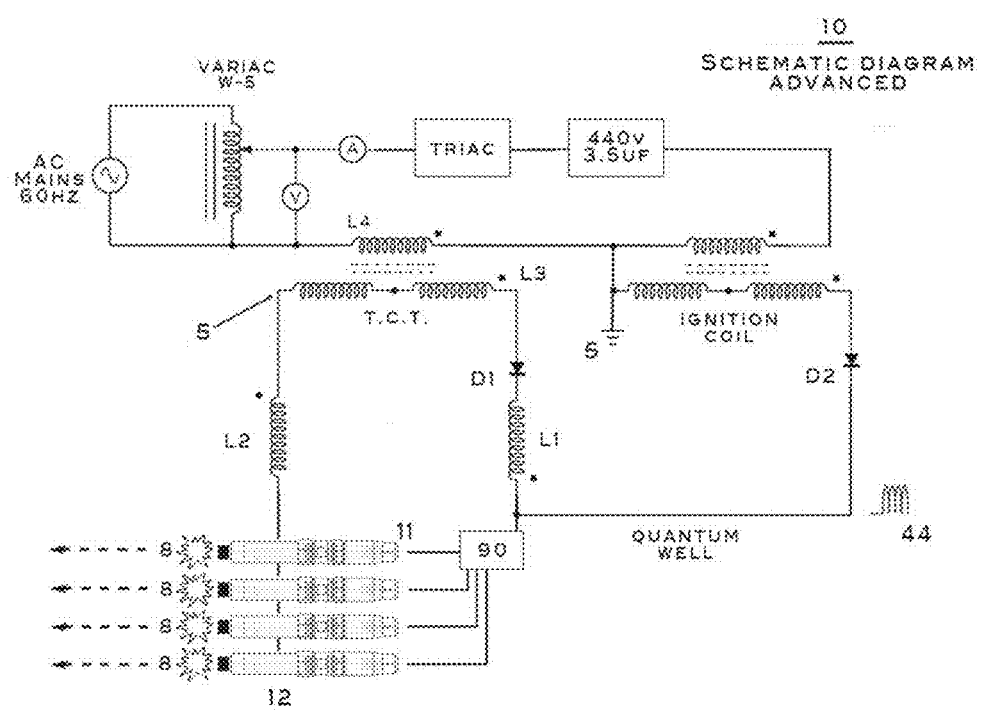
FIG. 7C1

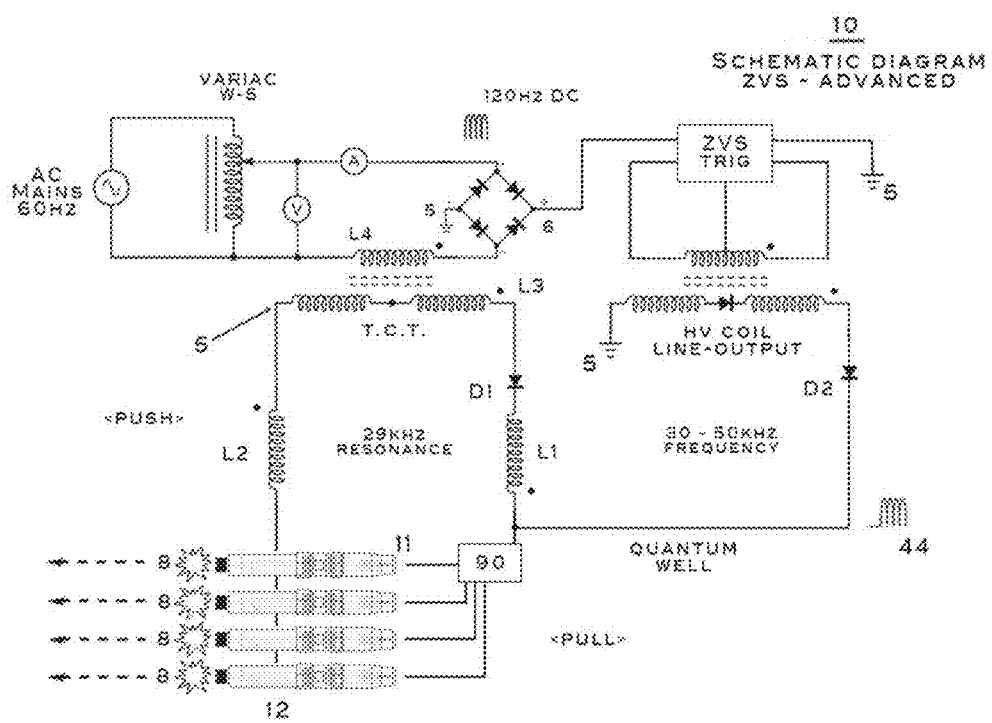
FIG. 7C2

QUANTUM KINETIC INJECTOR

1. BACKGROUND OF THE INVENTION

A. Field of Invention

This invention pertains to the field of electrolysis, particularly the performance of electrolysis using voltage, not amperage, in a purely physical process. This invention is aimed as a retrofit technology for the use in internal combustion engines, commercial airline jets, heating furnaces and rocket propulsion thrusters.

B. Description of the Related Art

A modern day fuel injector delivers, metered, and atomized liquid particles of fuel, typical gasoline, to a combustion chamber. The fuel injector pressure, of a typical vehicle, is between 2-4 bar (30-60 psi). The objective of the injector is to establish properly timed "atomized spray" patterns into the engine cylinder walls. If properly timed with an the igniting of a high voltage electrical spark, the result is a synced exothermic oxidation explosion reaction of heat, expanding pressure and kinetic force driving the cylinder piston in a mechanical motion to the driveline. This technology, the internal combustion engine, dates back to 1807, when the original fuel was not gasoline, but hydrogen. A Swiss inventor named Francois Isaac de Rivaz first invented the earliest hydrogen powered four-wheeled vehicle. The hydrogen powered engine patent was long before the gasoline powered engine patent . . . .

Hydrogen gas is well known in industry as the leading fuel in most devices, especially modern hydrogen rockets like Blue Origin's BE-3 engine (110,000 lbf of thrust). Modern day cars use gasoline known as a hydrocarbon as fuel. That is because, there are several hydrogen atoms covalently (electron shell) linked to the carbon atom in standard gasoline liquid fuel. Hydrogen fuel has an octane level greater than 130. Octane values determine the hydrogen concentrations of hydrocarbon (1 molecular octane=8 hydrogen atoms). Once the fuel, hydrocarbon i.e. gasoline (89 to 91 octane), is ignited, the resulting energy is released from the hydrogen as it oxides with the incoming O2 and nitrogen from ambient air from the intake manifold. What is left in prior art, after ignition, in the power equation, is heat, mechanical movement and exhaust (non-combustible) gases with locomotive power. The resulting "unburned" constituent's parts are carbon as monoxide, carbon dioxide CO2 or NOX (depending on heat temperatures within the chamber of course). These byproducts can be classified as "non-combustible" gases or ignition modulators of flame speed if recycling is necessary.

In a modern day, prior art, vehicle design, there is fuel injectors affixed to a pressurized fuel rail (30-40 psi), this is known as direct injection. A constant displacement pump within the fuel tank pressurizes the fuel rail along with a fuel pressure regulator. As the fuel is sprayed into the cylinder of the engine block. The "spark-plug" ignites the fuel and air mixture with an "electrically" igniting spark (AC 12,000 v-25,000 v). In this "normal-mode", the injectors work in conjunction with the sequentially firing spark plug(s). However, it is possible to combine these two units into a single revolutionary device . . . .

Normally, gasoline has approximately ~0.5 pounds of hydrogen in it. Whereas water (H2O) has ~1.7 pounds of hydrogen. This means that water is 2.5 times more explosive than gasoline. Within one gallon of gasoline (5.61 lbs/gal) there is approximately 0.656 lbs of hydrogen per atomic weight. This is due to the innate atomic structure, which is, typically composed of 10 carbon atoms and 3 to 8 hydrogen atoms forming the molecule (depending on the octane level). This means that gasoline, by atomic weight, is mostly composed of carbon, which is a non-essential fuel product. And since ~10-20% of the heat that is generated from the internal combustion engine is used for motion. That makes the standard automobile a very inefficient device, which unfortunately is more geared towards creating waste CO2 exhaust and waste heat than actual motion for vehicles and/or jets.

Interestingly, water (H2O) has two hydrogen atoms covalently linked to one oxygen atom. This means, by atomic weight, water's energy yield is 2.5× greater than gasoline (See U.S. National Bureau of Standards Monograph 168 (523 pages, February 1981)). The fact is, that within one gallon of water there is approximately 1.669 lbs of hydrogen. The ideal ratio of oxidation stoichiometric mixture reaction is 2:1 (2 parts hydrogen and 1 part oxygen) is enough to achieve maximum efficiency of detonation of hydrogen gaseous matter. Clearly, these facts render ordinary water a perfect fuel source for all exothermic devices since the water molecule supplies an additional oxygen atom for oxidation. And better yet, the exhaust gases from burning hydrogen and oxygen is water mist for re-use back into the storage tank!

It should be noted, that hydrogen and oxygen fuel gases, when ignited, transforms (join up) into the lowest energy phase/form known as liquid water (H2O). Which means, that water can be electrically polarized, ignited and then recaptured back into the storage tank for further utilization (once re-introduced to sun-light establishing electron density $E=hv$). Energy now, from the water molecule (water condensate), can be recycled into the internal combustion engine and then back into the fuel tank then repeating the process in a rocket combustion chamber or vehicle engine block. Any exothermic motorized unit may utilize the power of water as a prime mover within a "closed-loop" system.

Interestingly, as stated earlier, Blue Origin's BE-3PM hydrogen rocket fuel utilizes cryogenic oxygen (LOX) and cryogenic hydrogen (LH2) (solid fuel) as the fuel source within a combustion chamber. The rocket is a pump-fed engine (rocket) design. This gives full exothermic power factor during full throttle i.e. 490 kN (110,000 lbf). Blue Origin receives cryogenic oxygen (LOX) and cryogenic hydrogen (LH2) from Praxair. As one can clearly conclude, the thermal explosive force of hydrogen and oxygen is astronomic. Perhaps, there is a way to harness water's ferocious power yield i.e. hydrogen and oxygen from mere room temperature liquid water vectored for rockets thrusters on demand?

As one can surmise, the perfect renewable fuel for all industries is the natural liquid storehouse—water (H2O). However, in modern science and understanding, to economically access (tap into) hydrogen from water is proven quite exhausting using conventional standard Faraday electrolysis. Since, distilled water cannot be separated or polarized without adding a caustic additive like KOH (potassium hydroxide) or salt to the water. This makes production of hydrogen and oxygen fuel gases expensive and promotes electrode destruction due to the caustic solution. In addition, this prior art method of hydrogen production from water manufactures carcinogenic chemicals.

In the foregoing patent, we will discuss the evolutionary way to tap into the thermal explosive energy of water using a purely physical force (non electro-chemical).

The said technology is designed as a retrofit system to all existing combustion power plants. And in addition, safely vector the energy yield (thermal explosive energy—GTNT) of the hydrogen atom on demand to any system. This is accomplished by utilizing a microminiaturized water fuel cell and permits the direct injection of water and its simultaneous transformation into a hydrogen-containing fuel by an electrical resonant injector system—The Quantum Kinetic Injector.

II. Summary of the Invention

Provided herewith is an electrolysis system including an injector with a conical tapered resonant capacitor waveguide forming two voltage zones of polarity. A cylindrical anode probe of the injector is retained along a central longitudinal axis of the injector having a cylindrical diameter for establishing a positive charge reaction of a capacitive voltage region. An anode exciter component of the injector includes an anode end portion of the anode probe and having an anode conically tapered tip having a tapering diameter that progressively diminishes from the cylindrical diameter toward a tip end. The tapering diameter determines a guide path through the injector for a dielectric medium. A cylindrical cathode probe is retained concentrically within the anode probe along the central longitudinal axis of the injector for establishing a negative charge reaction of the capacitive voltage region. A cathode exciter component includes a cathode end portion of the cathode probe having a cathode tapered tip conically parallel with the conically tapered tip of the anode end portion. The anode and cathode end portions form a compression exiting nozzle port. The compression exiting nozzle port is configured to receive a mixture of water mist and fuel gases and to focus the mixture into a trigger zone of fuel gas combustion which triggers an electrolysis reaction in the water mist.

In the present system, the water mist is received into the injector as 6-148 micro-liters of water droplets per injection cycle. The trigger zone of the compression exiting nozzle port is preferably a singularity point of collision 2-3 cm outside the injector. The anode and cathode exciter components are preferably composed of Stainless Steel T304 which provides conductivity and material strength to withstand oxidation reactions.

In another aspect of the present electrolysis system, a plurality of injectors are included for providing an electrolysis reaction. Each of the plurality of injectors includes a conical tapered resonant capacitor wave-guide forming two voltage zones of polarity. A cylindrical anode probe is retained along a central longitudinal axis of the injector having a cylindrical diameter for establishing a positive charge reaction of a capacitive voltage region. An anode exciter component includes an anode end portion of the anode probe and having an anode conically tapered tip having a tapering diameter that progressively diminishes from the cylindrical diameter toward a tip end. The tapering diameter determines a guide path through the injector for a dielectric medium. A cylindrical cathode probe is retained concentrically within the anode probe along the central longitudinal axis of the injector for establishing a negative charge reaction of the capacitive voltage region. A cathode exciter component includes a cathode end portion of the cathode probe having a cathode tapered tip conically parallel with the conically tapered tip of the anode end portion. The anode and cathode end portions form a compression exiting nozzle port. The compression exiting nozzle port is configured to receive a mixture of water mist and fuel gases and to focus the mixture into a trigger zone of fuel gas combustion which triggers an electrolysis reaction in the water mist. The electrolysis system also includes a distributor in connection with each of the anode probes and cathode probes of each injector for establishing a firing sequence for each injector. A tri-coil transformer (TCT) is in connection with the distributor for establishing a resonance with each injector.

III. BRIEF DESCRIPTION OF DRAWINGS

Figure 1A:
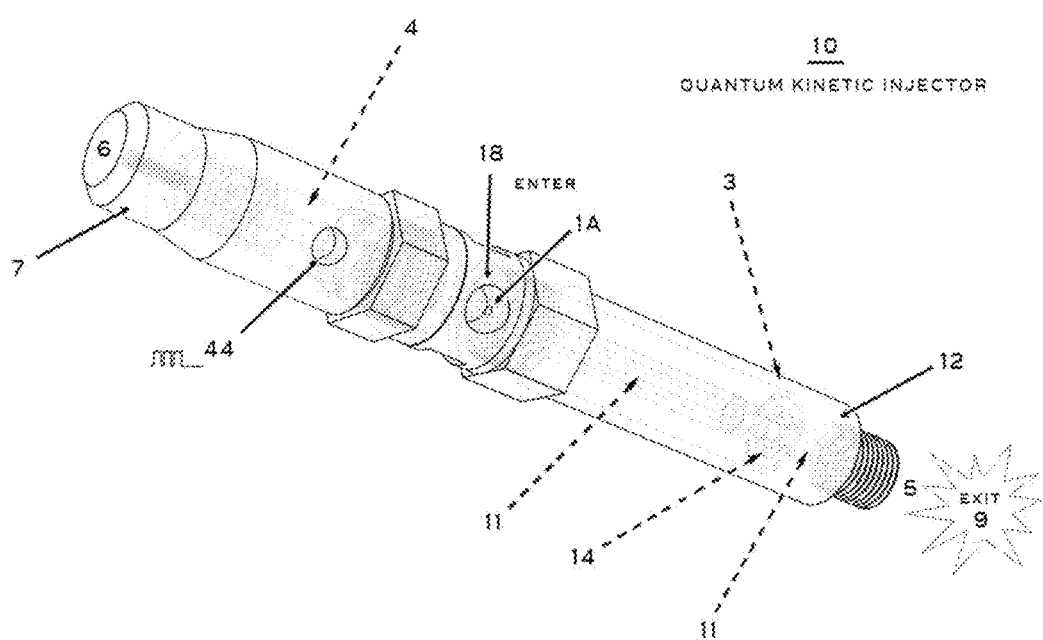
FIG. 1A is a topside/outside view of the injector and the respective ports and connections.
Figure 1B:
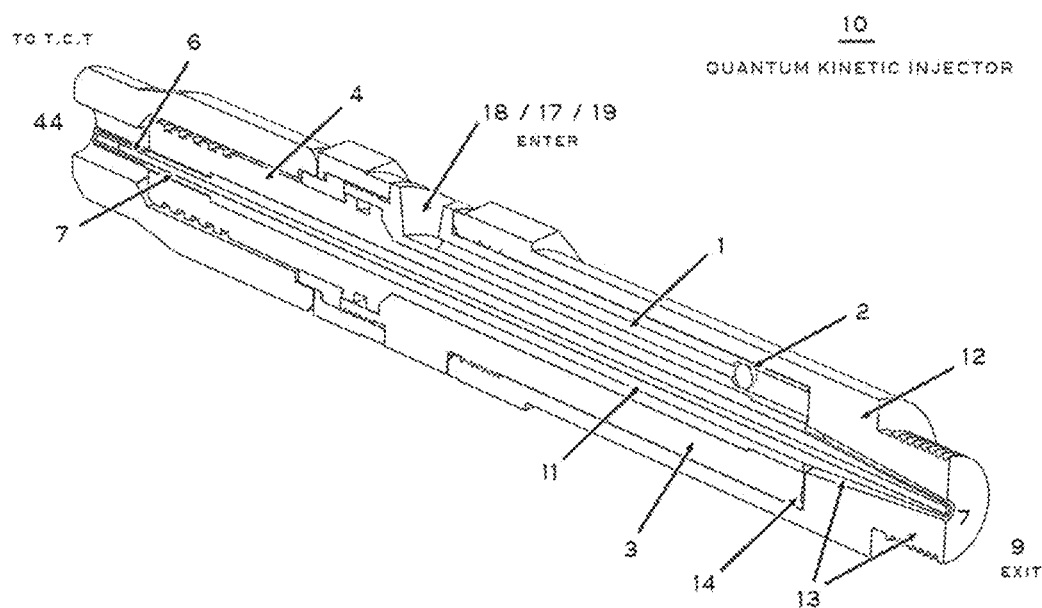
FIG. 1B is a cross-sectional view of the internal components of the injector.
Figure 1C:
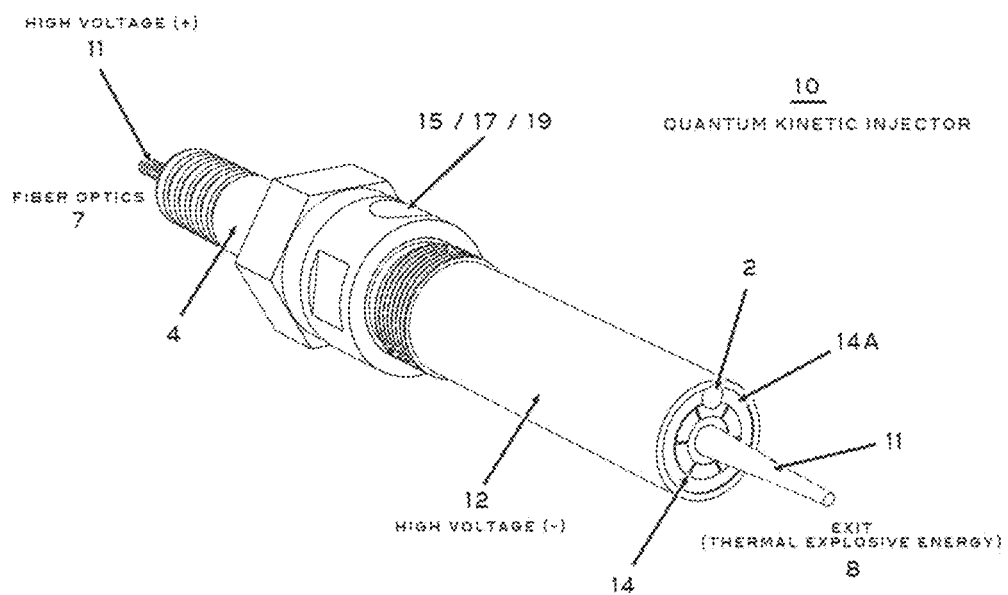
FIG. 1C is a view depicting a plug housing affixed with insulating Macor ceramic sheathing to protect during high voltage electrical operations. Additionally, the conical tapered probe tip is in view.
Figure 1D:
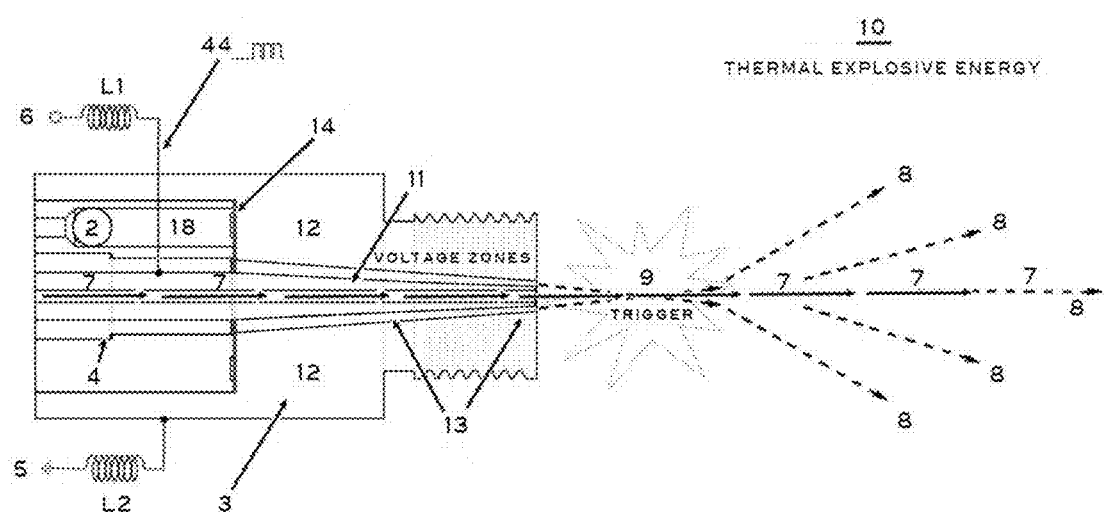
FIG. 1D is a view showing "Activation Zones" and thermal explosive energy flame profile of the injector. The triggering singularity point can be clearly depicted.
Figure 1E:
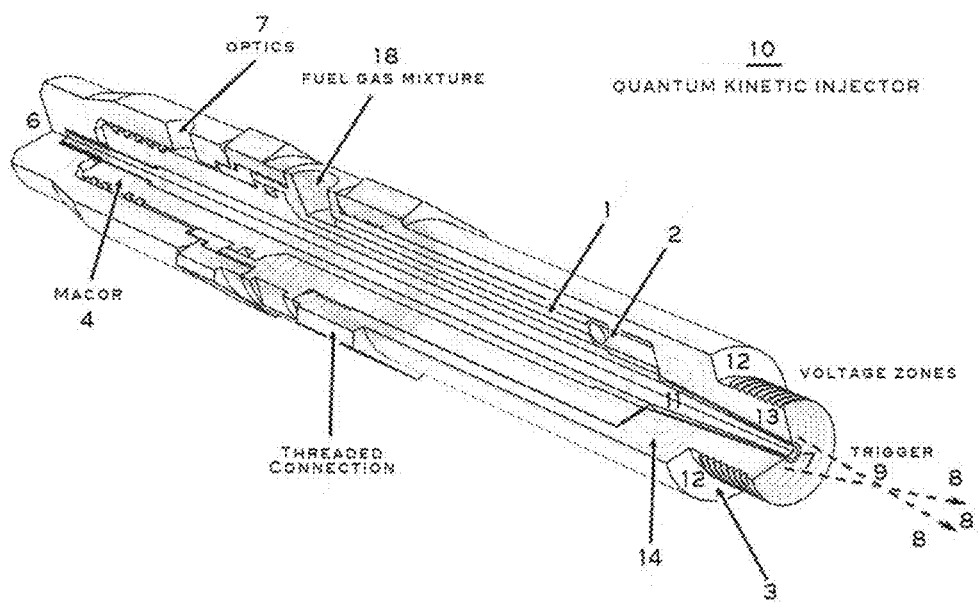
FIG. 1E is a cutaway view of the internal workings of the injector along with the "trigger" zone of singularity for thermal explosive energy.
Figure 2A:
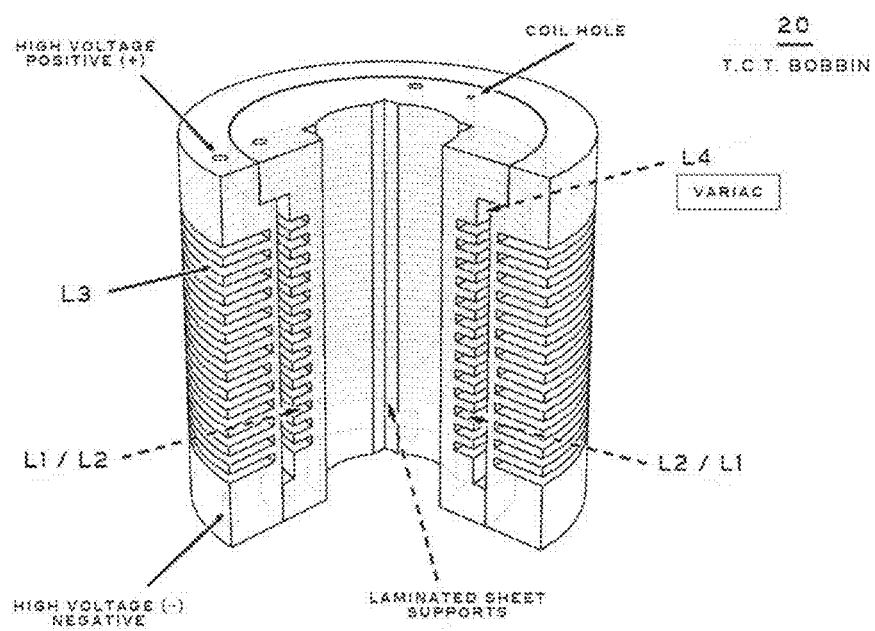
FIG. 2A is a view of a T.C.T. transformer Delrin bobbin unit and respective coil windings.
Figure 28:
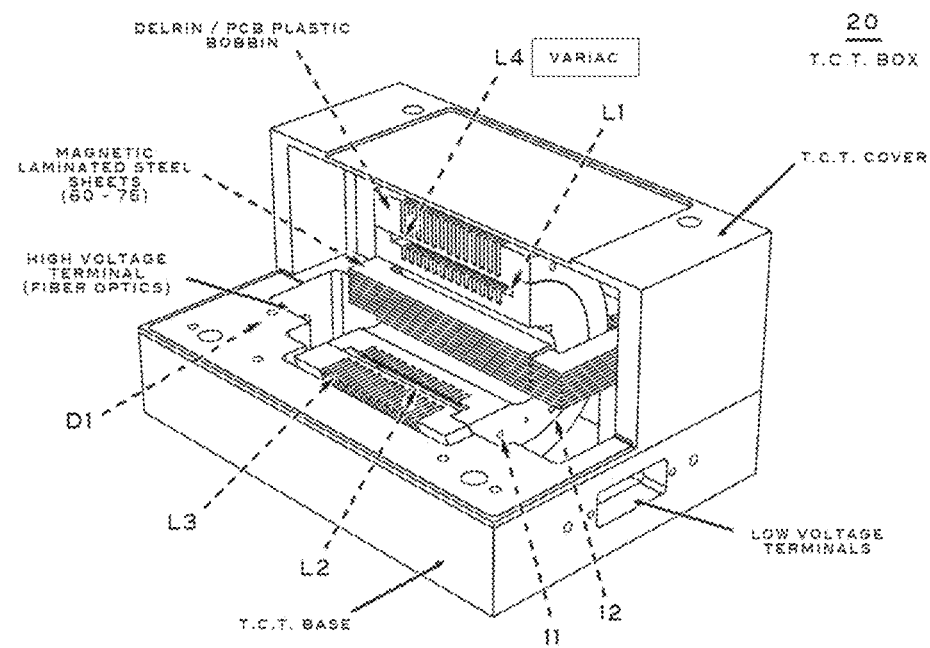

FIG. 2B is a view of a T.C.T. unit affixed into protective enclosure. Laminated sheet wrapped around T.C.T. bobbin. Note: cross sectional view.

Figure 2C:
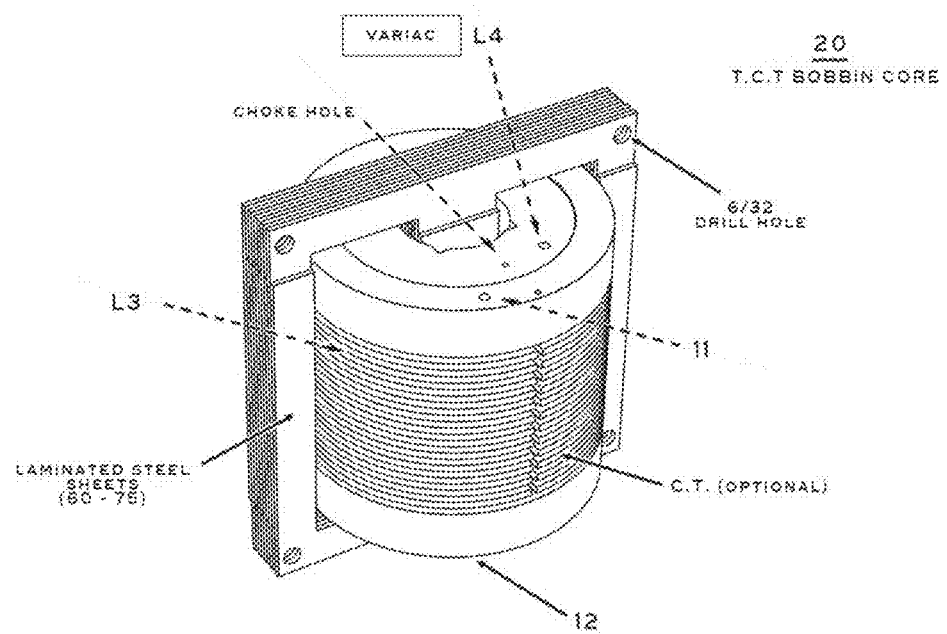

FIG. 2C is a clear view of the T.C.T. bobbin married to laminated steel sheet E and I core.

Figure 3A:
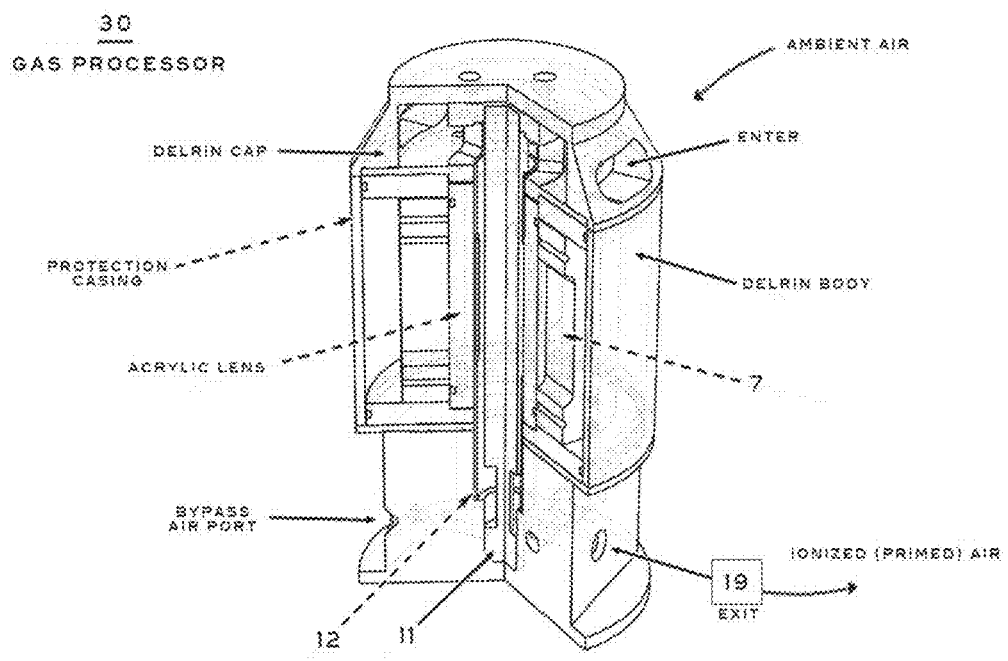

FIG. 3A is a view of an ambient air ionizer device [Gas Processor] to "prime" oxygen atoms for utilization in the thermal explosive energy enhancement.

Figure 3B:
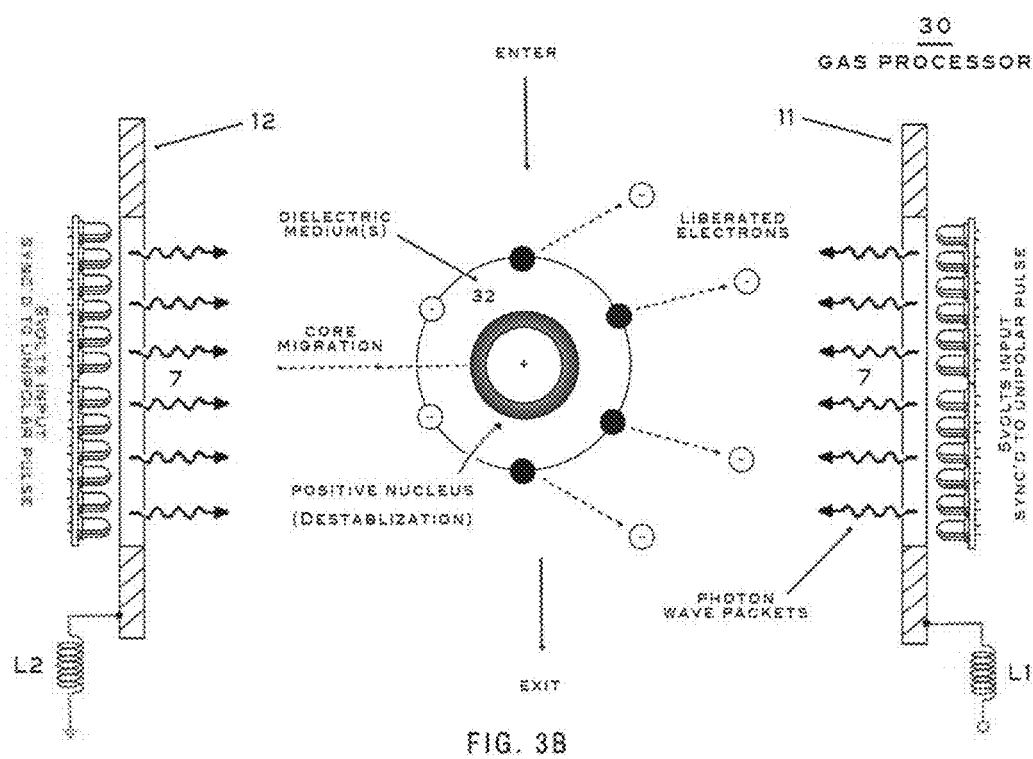

FIG. 3B is a diagram of ionization of oxygen and ambient air gases for fuel gas mixtures to the injector.

Figure 4A:
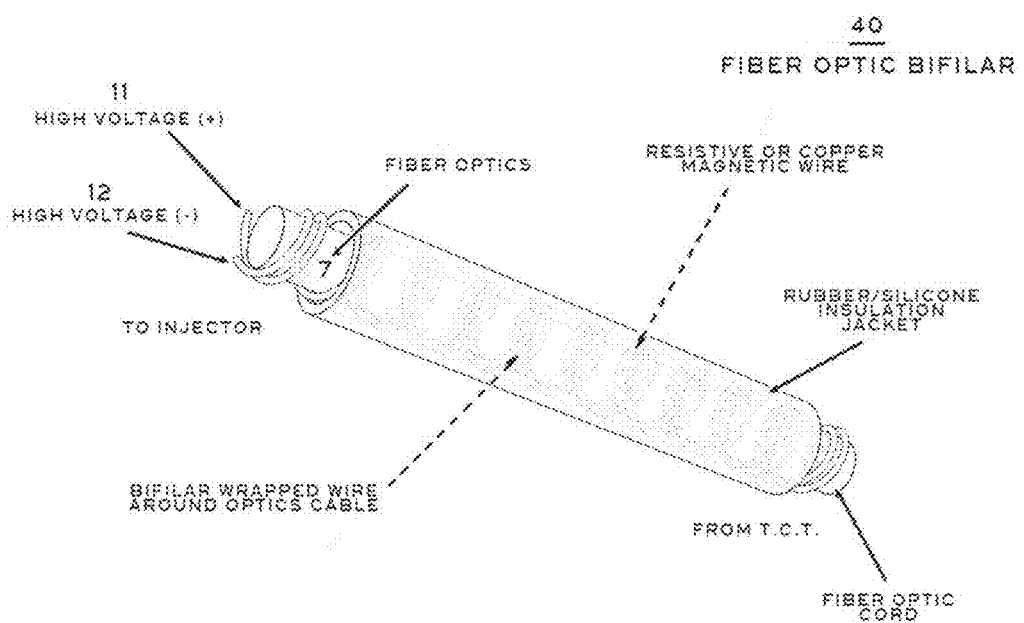

FIG. 4A is a view of a fiber optics cord, which, holds the L1 and L2, coil bifilar extension connections to the injector (optional).

Figure 5A:
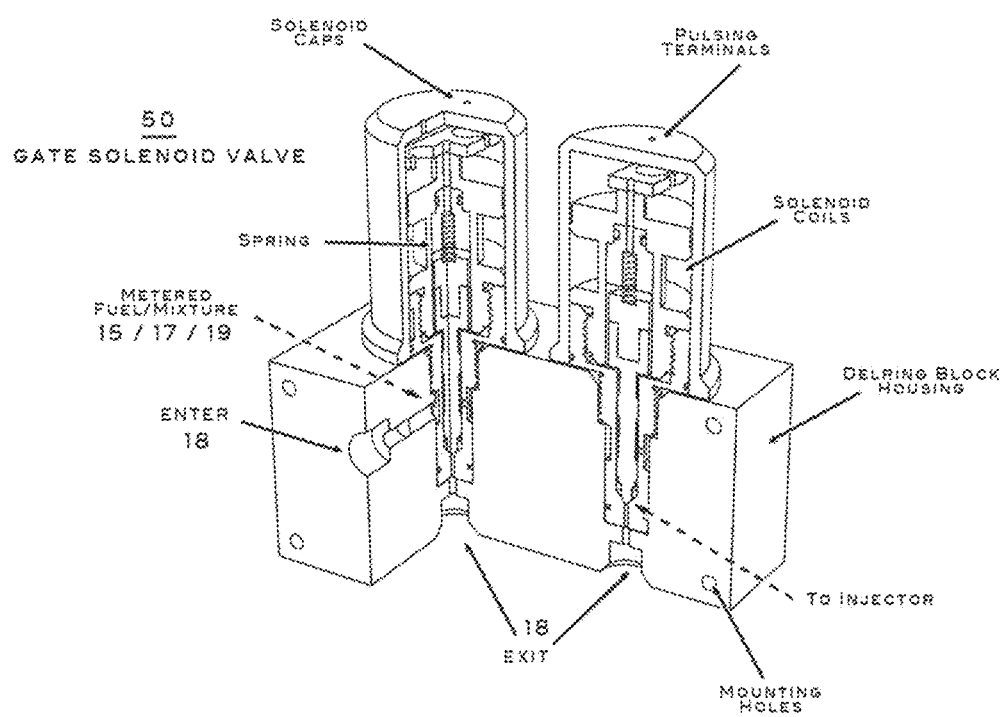

FIG. 5A is a visual cutaway of the injector gate solenoid device, which allows for metered fuel gas mixtures to be injected into the injector(s).

Figure 6A:
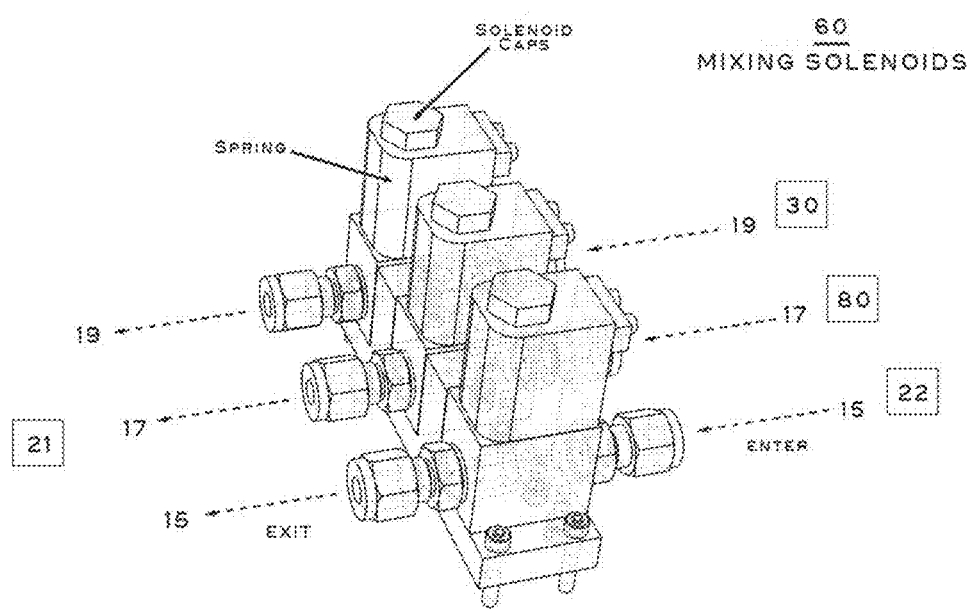

FIG. 6A depicts the linear mixing fuel gases solenoid manifold.

Figure 6B:
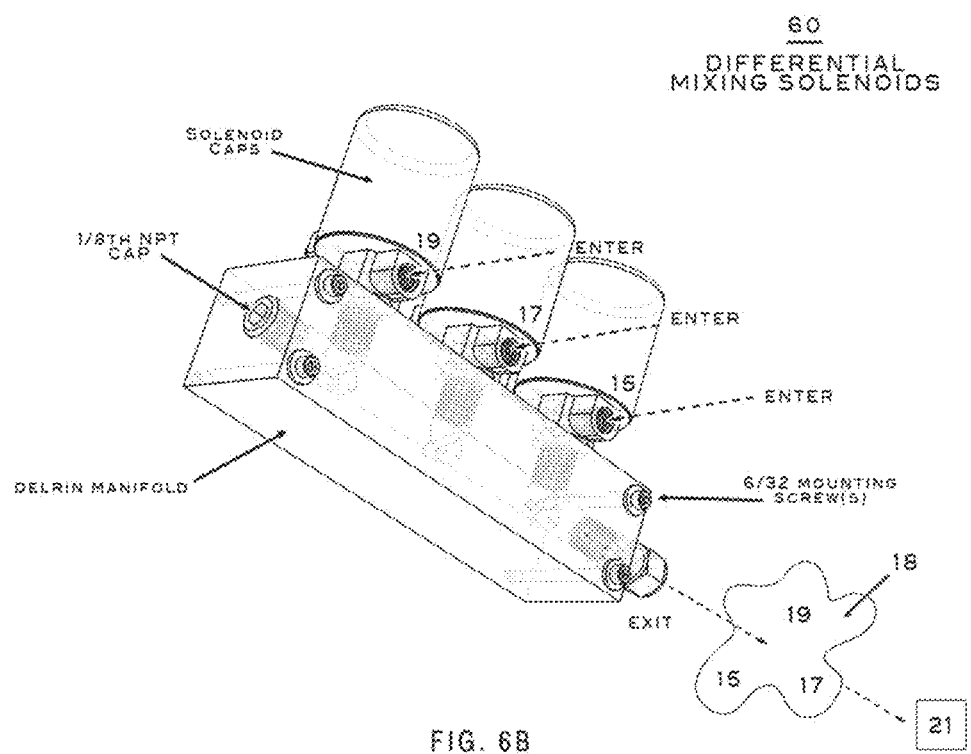

FIG. 6B depicts the differential mixing fuel gas solenoid manifold.

FIB. 7A is a wire diagram of a dual pulse network schematic drawing

FIB. 7A1 is a pulse rate gate unipolar pulse network

Figure 7A:
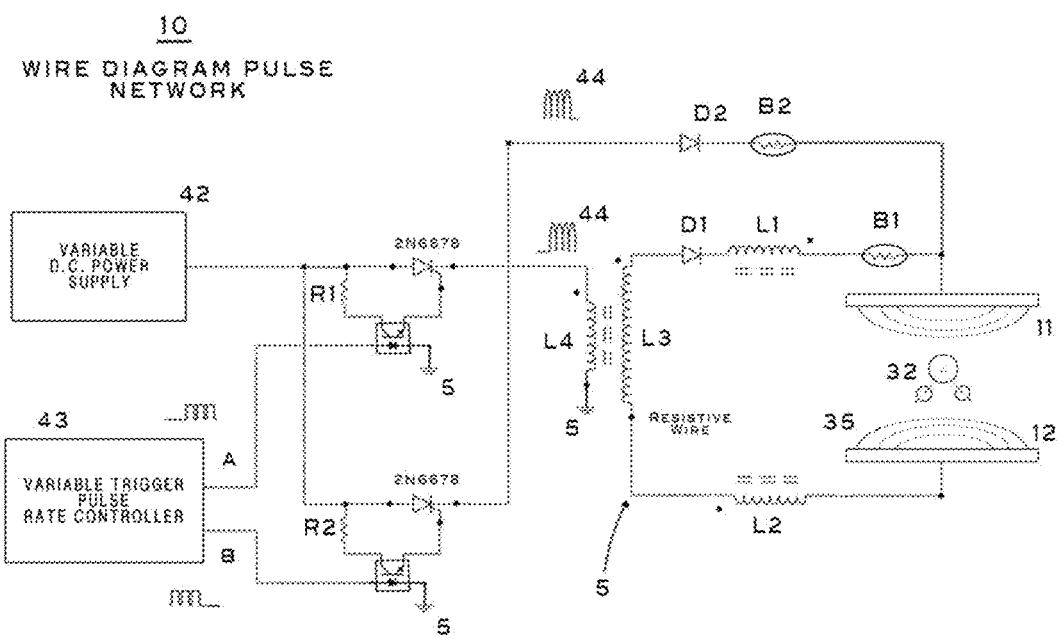
Figure 7B:
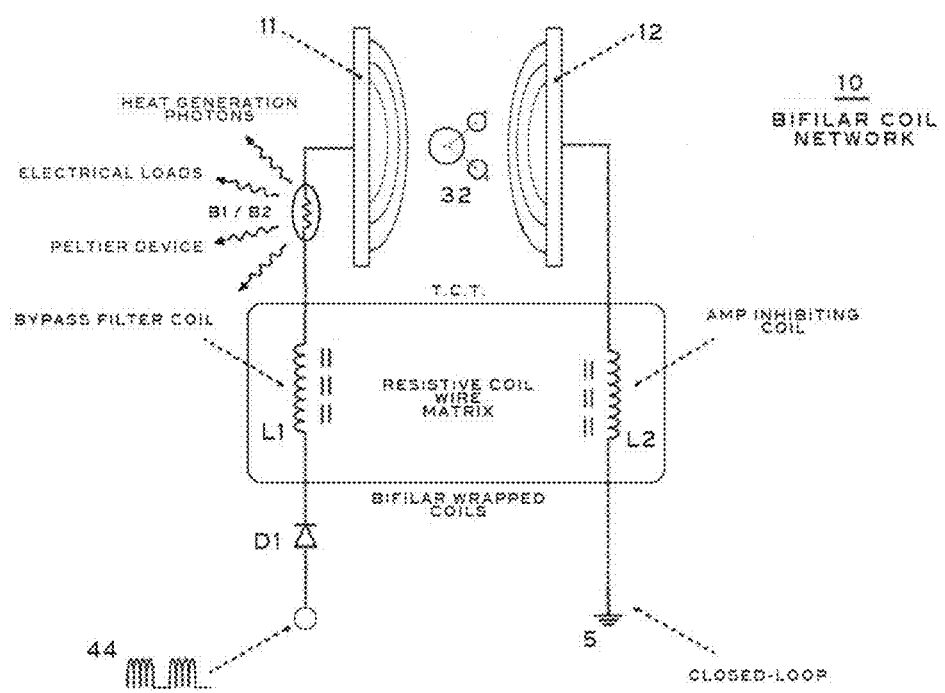

FIG. 7B is an inductive bifilar capacitive network diagram drawing

Figure 7C:
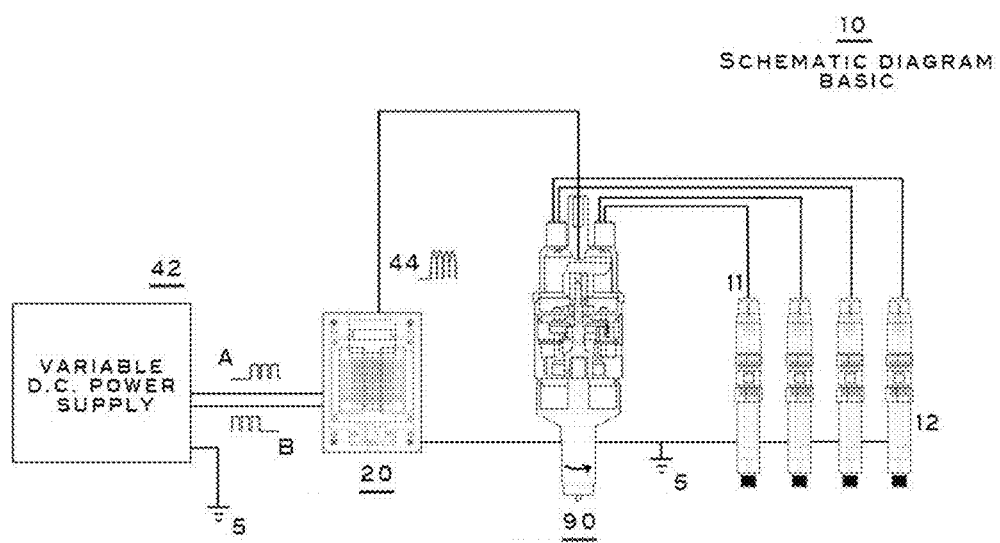

FIGS. 7C, 7C1, and 7C2 are basic drawing schematic wiring diagrams for electrical timing with Laser Distributor.

Figure 8A:
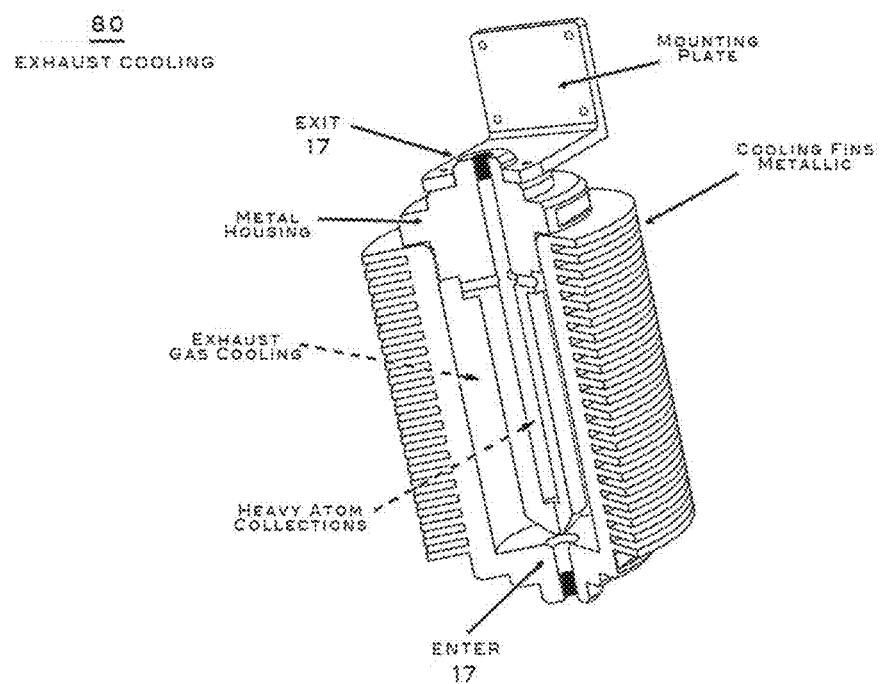

FIG. 8A is a drawing of cut-away of the exhaust gas cooling and filtering device for (EGR) Exhaust Gas Recycling.

Figure 9A:
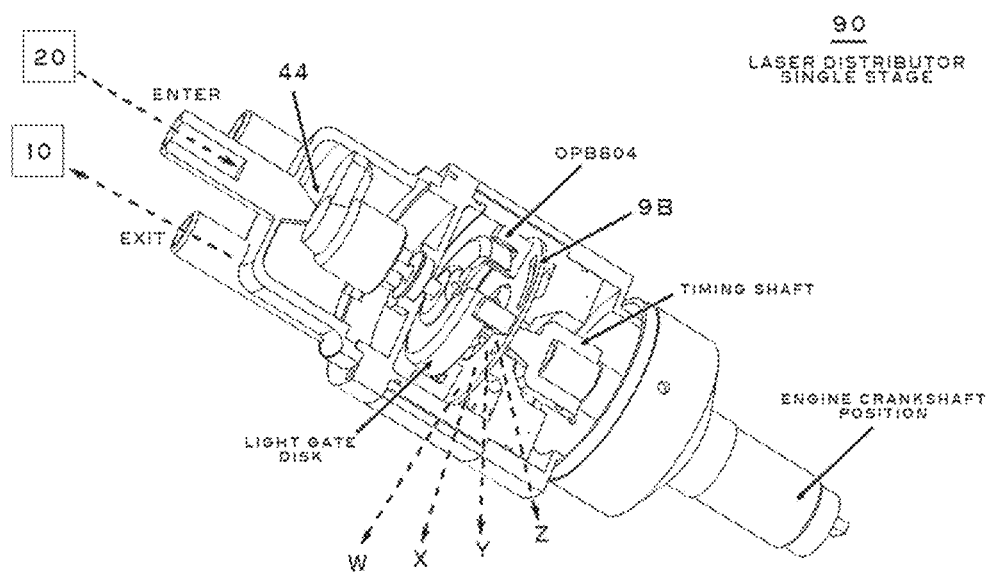

FIG. 9A is a section view of the Laser Distributor and respective elements

Figure 9B:
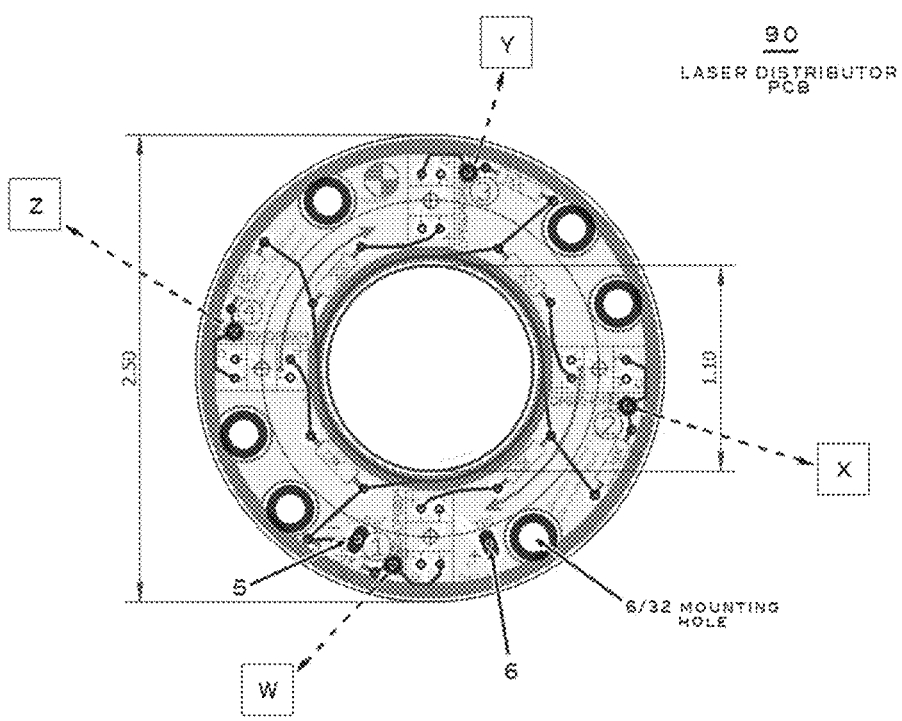

FIG. 9B is a laser Distributor PCB board layout drawing

IV. DETAILED DESCRIPTION

Reference is now made to the drawings wherein the showings are for purposes of illustrating embodiments of the article only and not for purposes of limiting the same, and wherein like reference numerals are understood to refer to like components.

The Quantum Kinetic Injector 10 is an "open-air" tapering conical tapered resonant capacitor wave-guide forming two voltage zones of polarity. Anode 11 probe is affixed within the center of the injector body. This establishes the positive (+) charge reaction of a capacitor. Both anode (+) 11 and cathode (−) 12 may be composed of conductive metallic material such as Stainless Steel T304. Any electrode material may be utilized as electrode "Exciters". However, Stainless Steel T304 offers material strength and aids in preventing oxidation reactions (high chromium content). The center probe "Exciter", is designed with a leading edge tapered tip, which diminishes from a 0.01 gap progressively toward the tip end of the injector. See FIGS. 1B & 1C. This tapering dimensionality determines the guide path or wave-guide for the dielectric 15. See FIG. 1D.

The cathode 12, which is negatively charge (−), is the capacitive negative voltage region and/or "Exciter", which is conically parallel with the tapered positive probe electrode 11. See FIG. 1A. This forms the conical shaped resonant cavity waveguide capacitor (water fuel cell) i.e. voltage zones 13. The design amplifies voltage region(s) as the water mist fuel gases 18 is sprayed through and toward(s) the tip nozzle end. As the water mist 15 (water droplets—6 to 8 micro-liters per injection cycle) and "fuel gases" 17, 19, 18, which can be hydrocarbon fuel, proceed down the conical resonant cavity, the polarization increases progressively (dwell time), this is referred to as the electrical "activation zone" 13. See FIGS. 1C & 1D. Truck applications would require ~148 micro-liters of water mist per injection cycle. Secondly, the tapered tip design of the injector acts as a compression exiting nozzle port, which focuses the "electrically primed" i.e. destabilized fuel gases mixture 18 into a singularity point of collision 9 approximately 2-3 cm outside the injector. See FIG. 1D. The importance of the focused singularly region will be discussed as the "Trigger Zone" 9 in the foregoing patent.

To begin the processes simply inject, a pressurized and metered amount (60-125 psi), of water mist 15 into the injector plug-housing passageway 3 at desired pressure from water storage tank 22. Truck injection pressure would need to be upwards of 135 psi or greater. See FIGS. 1B and 1E. Stainless Steel T304 ball (0.125-inches diameter) 2 and spring establish check-valve passageway 1A per each successive gate opening pulse burst 44 of fuel gases 18. See FIG. 1A. Opening and closing gate solenoid 50 meters water 15 and fuel gas mixtures 15, 17, 19, 18 to enter into the quenching disk 14 and 14A region of the injector 10. See FIG. 1C. The six, equally spaced quenching disk 14 design (0.010-0.015-inch slots) allows for anti-spark back into the high pressure delivery system while allowing dielectric mediums (gaseous misted matter) to pass through. This is accomplished with a positive displacement pump 21 (NorthStar or AEM—High Pressure Sprayer Fuel Pump 150 psi) affixed to a 12 v pulsing differential gate solenoid manifold 40. A 3-Way spaded stackable differential solenoid mixing manifold 60 valves can be affixed to aid in mixing dielectric before entering gate solenoid 50 and ultimately to said injector 10. Fuel pressure regulator (AEM high performance regulator) may be affixed between positive displacement pump 21 and injector gate solenoids 50 to ensure desired flow rate pressure (60-125 psi). Typically, 125 psi will suffice, however, higher-pressure values can be used for greater force per-square inch per unit volume. This pressure ensures proper energy-flame projection and subsequent energy-flame stability. In addition, volumetric system pressure allows water mist 15 and fuel gases 18 to be intimately mixed in the combustion zone and electrical polarization zone 13. The voltage activation zone 13, which is waveguide length of 1-inch between the anode 11 and the cathode 12, triggers the electrical polarization (dwell time) of the water mist 15. See FIGS. 1C and 1D. By simply attenuating the voltage input from 500 volts to 45,000 volts establishes physical polarization (disassociation) and separation of the water mist 15 is varied for specific energy needs (drive-units). Input resonant voltage frequency may range from 1 KHz to about 50 KHz. Dielectric destabilization from electric pressure causes electrons to "switch-off" innate covalent bonding of the water molecule. This is classified as a triggered covalent "switch-off" mode and influences the electrons spin time rate. Which allows the hydrogen's single electron to release covalent bonding shared within the K and L-orbit of the oxygen atom instantly. This electrical phenomenon is purely physical in nature and not chemical. Furthermore, and most importantly, during electrical polarization (negative differential electron pressure), the spin speed of the electron slows down due to Coulomb Repulsion de-shielding effects within the electrically charged activation zone 13. This is accomplished using the Quantum Kinetic Well phenomenon. The thermal explosive energy 8 yield of the water 15 is determined by several key factors within fractions of a second.

Six variables are used to control the thermal explosive power of water.

One: The concentration amount of water mist 15 injected into the injector.

Two: The voltage potential of the activation zones 13.

Three: The constant displacement pressure 21 at which the dielectric fuel gas mixture 18 is pressurized through the activation zone 13.

Four: The concentration/saturation of electrically and laser primed oxygen (ionized) 19 mixed into the water mist 15 upon entering activation zone 13 See FIGS. 3A & 3B.

Five: Selected targeted frequency spectrum of pulsed (photon) laser energy 7 into the Trigger-Zone 9 (IR, VL or UV).

Six: The concentration of the non-combustible gases 17 (exhaust gases) into the fuel gas mixtures 18. See FIG. 1A through 6A.

All these key variables are used to determine the thermal explosive energy 8 yield of said invention 10. Exhaust gas i.e. fumes 17 consist of some water vapor. This water vapor re-introduced into the combustion chamber allows for evaporation post detonation cycle. The precipitated water turns to gaseous matter form causing an instant cooling effect to the headers and engine. In addition, engine RPMs (revolutions per minute) is also decreased to modulate the engine to appropriate speed during idle and freeway operations. The resulting reaction of hydrogen and oxygen oxidation during a thermal event always leads to water (H2O) formation. De-ionized water (H2O) can be captured from the exhaust manifold and directed back into the water storage tank for re-use.

To establish proper physical electrical triggering of the apparatus, a Tri-Coil Transformer (T.C.T.) 20 is affixed to the anode 11 and cathode 12. See FIG. 2C. Each injector 10 is fired using the T.C.T. 20 at resonance. Said electrical operational parameters at triggered with the Quantum Kinetic Well (as disclosed in the present inventor's U.S. Pat. No. 11,233,421, the disclosure of which is hereby incorporated by reference). Operational sustainability is maintained via the electrically driven DC electric unipolar-chirped pulse 44 networks to the T.C.T. transformer 20 See FIG. 2B. The resonant frequency between the T.C.T. 20 and the injector 10 do not vary between water or air dielectric selections. See FIG. 7C. This is due to the small capacitive gap size. Since capacitance "Q" factor is nearly identical to air as it is for water, −41.08 for water and −41.86 for air (30 Khz reference/tap water) reference: High Precision 200 KHZ—LCZ Meter (4/20/2020). In addition, the phase angle between air and water is practically identical at −88.62 for air and −88.59 for water (30 Khz reference). The resonant frequency of the T.C.T. 20 to the injector 10 with air or water dielectrics is practically identical. This stabilizes the resonant tank circuit (T.C.T. 20) during unipolar pulse 44 firing operations with fuel gas mixtures 18 (water mist 15, ionized 19 air and exhaust gases 17). This is referred to as inductive and capacitive reactance electron balancing (ballasting) and transforms the capacitor from an imaginary load to a real capacitive load. The resonant frequency can range from between 60 hz-1 Mhz depending on T.C.T. 20 coil design, coil turn count and gauge of wire used. Those skilled in the art will engineer for desired voltage outputs and current ratings.

The importance of operating T.C.T. 20 at resonance is to perform amp-inhibiting properties (electron bounce phenomenon i.e. dynamic cathode resistance) during each unipolar pulse 44 burst. See FIG. 7A1. Resonant frequencies establish standing wave patterns in the "Closed-Loop" circuit-wiring matrix. This is known as a ONE-Dimensional plasma wave within the T.C.T. coils of wire. See FIG. 7A. This allows voltage zones 11 and 12 to extend towards infinity and amperages to operate at lowest possible values if electronic components allow. The apparatus operates at full optimization at resonant frequencies interfacing with selected dielectric mediums 18. This effect is attenuated and activated electrically through the resonating T.C.T. 20. However, it is possible and most certainly not preferred, to operate outside the resonant frequency of the "Closed-Loop" circuit. See FIG. 7C1.

Utilization of the intrinsic dielectric properties of water mist 15, ionized ambient air 19, noble gases, vacuum space and any other dielectric constant medium(s) as part of a tuned, "Closed-Loop" Resistor (R), Inductor (L), Capacitor (C) circuit is now obtainable. The resonating RLC circuit manifest simple harmonic electrical fluctuations during oscillation impulses, which can be electrically, amplified using modern day Integrated Chips (IC Chips) and uniquely designed inductive coils (Resistive or Copper). Amplitude modulations (A.M.) principles are utilized within the diode/coil arrangements to enhance the voltage wave charging effect (Plasma Oscillations—Plasmon) 35 to the tapered capacitive plates 13. See FIG. 1D. Tapered capacitive plate design further amplifies induced voltage levels of the T.C.T. 20 much like musical acoustic instruments amplify vibration and compression harmonics. The Interfaced power transistors 2N6678 maximize the voltage intensity into the injector 10. See FIG. 7A. Those skilled in the art will be capable of obtaining adequate voltage levels for desired dielectric mediums polarization.

Proper pulse firing timing through T.C.T. 20 to injectors 10 is established with a PCB board affixed within the distributor cap. The modified distributor is called the Laser Distributor 90. See FIGS. 9A & 9A1. The Laser Distributor uses four OPB804—GaAs infrared emitting diodes phototransistors are arranged in a circular pattern on a 2.50-inch PCB board 9A. The internal section of the PCB, which is 1.10-inches in diameter slides into a machined aluminum 6061 (or Stainless Steel T304) cavity with a spinning shaft affix to rotary armature of engines timing crank position. A light gate aluminum black anodized coated disk (light absorbing color) is affixed to spinning shaft within the Laser Distributor 90. The light gate disk as a 0.25-inch to 0.50-inch open slit cut into one side. As the Laser Distributor 90 spins with the crank position within the distributor (engine crankshaft), the light gate disk allows triggers square-wave pulses (W, X, Y and Z) to respective IC chips for processing and wave shaping. See FIGS. 9A & 9B. A mono-stable multi-vibrator integrated chip—CD4047 (Mouser) allows for short square wave pulse from phototransistors OPB804 to be elongated (one shot resistor and capacitor tuning) for use in both injector gate solenoids 50, or differential solenoid mixing chamber 60, and finally trigger T.C.T. 20 to fire in proper sequence to engine cylinder positions. See FIGS. 7C & 7D. While, IC chip 7414 (Mouser) allows signals to be hex flipped allowing control over square-wave pulse burst to respective aspects of said device(s) in conjunction with LM741 opt amps to enhance strength of the Laser Distributor signals.

The dielectric of ambient air gases, as an example, can be economically polarized (decoupled) with this apparatus. Tuned resonant pulse voltage spikes can be tuned to a specific electrode's natural acoustics frequency to further amplify the dissociation using the Helmholtz resonator (phonon) effect. In this foregoing patent, the electrode material is Stainless Steel T304, but can be composed of any conductive material. Stainless Steel T304, like other metals have "selectable" structural lattice acoustic resonant frequencies (based on size, shape and depth of the capacitive resonator). Helmholtz acoustic coupling is an engineering feature for those skilled in the art will use for enhancement of this "physical" force. Stainless Steel T304 quantum acoustic (phonon) excitation resides between 1 Khz-30 Khz.

Furthermore, at higher voltage pressure levels, the fermion's innate wave function architecture is destabilized for extraction (B Pulse) into the electrical "Closed Loop" system networks as (A Pulse) relaxes.

Electron Extraction unipolar B pulses 44 can now harvest matter to energy (electron-mass) attenuation into an electroconductive "resistive" or "non-resistive" pulsed choke wire coils L1 and L2 is attenuated on demand within each injector 10 pulse fire. See FIGS. 7C & 1D.

Whenever, the mass size of a combustible gas atom is increased, the thermal explosive energy-yield is increased during thermal gas combustion detonation. During pulsed voltage operations, electrons and atomic structures (subatomic particles and neutron clustering) are primed for instantaneous ignition by physical impacting 9 during exiting orifice of the conical top of the apparatus. All types of propulsion device(s) may utilize this injector; including the, and not limited to, internal combustion engine, furnace heating, jet turbine and rocket engines.

Fundamentally speaking, this electrical force is 180 degrees out of phase of prior art of science, instead of a capacitor plate cell "arc discharge" stemming from the cathode 12, this is a dielectric collapse discharge event extracted from the inherent atomic Quantum Zero Point Energy of the dielectric—Quantum Kinetic Well. It is the dielectric's electron(s) that fall into the "Quantum Kinetic Well" towards the anode 11. Electrostatic plasma oscillation 35, density strength is proportional to plate surface by the radius squared. Consequently, positively (+) charged ions or nuclei will be physically attracted to the cathode 12 in this process. This is a physical process upon the dielectric constant values of the quantum flux vacuum of every dielectric medium 18 caught between the energized capacitive 13 antenna plates 11 and 12 respectfully. Electrons can be controlled and manipulated a specific way using these triggering switching junction gates. After all, electrons always like to find the path of least resistance within a circuit . . . If allowed . . . .

The effects are amplified or enhanced with crossbreeding of circuit components i.e. coils, chokes, step-up transformers, resonant transformers, center tapped transformers, diodes and many other electrical elements. Those skilled in the art will follow proper design applications to the process stated below.

"Trigger Zone" is classified as the auto ignition zone 9 of the injector 10. See FIG. 1D. This is also classified as an "impinging injector" stance as electrically primed fuel gases collide together into a singularity zone. Due to the tapered design of the injector, the electrically polarized and destabilized fuel gas mixture 18 are focused into a focused singularity zone 9 upon exiting the tip nozzle 10. The "Trigger Zone" 9 region are varied and adjusted from 2-3 cm to 5-7 cm for desired industrial applications. As the electron deficient fuel gases (oxygen and hydrogen 32) 18 atom(s) collide with a net force, the resulting force spawn, smaller atomized particulates, mixing and auto ignition of thermal explosive energy 8. In addition to kinetic forces activating the thermal explosive energy 8, fuel gases are distributed evenly within the combustion chamber (Similar to Saturn V Rocket). Electromagnetic laser wave energy 7 in the form of pulsed photon coherent laser may be introduced into the impingement process. Electromagnetic energy 7 having no mass but momentum attributes will also stimulate even lower auto-ignition. See FIG. 1D. The photon energies can range from ultra-violet 10-390 nm through to infrared 700-1030 nm spectrum levels. Shorting photon square wave unipolar 44 pulse rate firing and/or photon wavelength increases the quantum probability of an electron orbital ionization event (quantum leap) between quantum electron orbital's within the dielectric 32. This effect enhances the thermal explosive energy 8 of the reaction. Laser beam from fiber optic cable 7 should be sync'd during pulse firing of injector 10 to ensure said "full" activation of the trigger zone 9.

"Normal-Mode" operations of auto ignition, temperatures must reach sufficiently high levels to begin auto ignition. The auto-ignition temperature i.e. stoichiometric mixture, 2:1 hydrogen:oxygen, at normal atmosphere pressure auto-ignition is −997 degrees F. This is due to the fullness of the electron mass densities of the atoms prior to ignition. However, in this "New-Mode" situation, the gaseous fuel matter (15, 17, 19) does not sustain full electron densities. This is due to the electron extraction B pulse(s) chain of the unipolar pulses 44 to the T.C.T. 20. See FIGS. 7A & 7B. Now, in this "New-Mode" the high temperature levels are not required to spawn this oxidation ignition event (auto-ignition), just mere physical collisions spark the auto-ignition. This is due to effects associated with dielectric collapse within the Quantum Kinetic Well™ (USPTO# 11,233,421) induced by the compression waveguide of the injector 10. Gaseous matter (15, 17, 19) is instantly fused into "thermal explosive energy" 8 (GTNT: thermite—iron, aluminum, sulfur, phosphorus oxide material). This effect is further enhanced by the ionized and laser primed oxygen being introduced by the Quantum Process.

The high kinetic forces (125 psi or higher) and the 'insufficient' electron densities (electrical destabilization) are enough to "trigger" thermal explosive energy 8 yields from these ejected fuel gases 18. The "Voltage Zones" 13 spawns neutrons densities clustering due to sub-atomic particle interactions (Zero Point Energy). However, in this case, it is completely safe and the energy yield parameters can be attenuated (vectored) for desired applications and industries inside the desired engine platform on demand.

Thermal explosive energy 8 temperatures from hydrogen can reach as high as 2,660 degrees Celsius. This explosive temperature from the injector can be modulated. Introducing exhaust gases 17 that are non-combustible gaseous matter (helium, nitrogen etc.) will render lower temperatures and burn speeds. Conversely, introducing ionized primed oxygen 19 can enhance the burn speed and temperature of hydrogen (Hydrogen Fracturing). The said device 10 allows for full systematic vectoring of thermal explosive spectrums 8. Thermal atomic interaction 8 is caused when sub-critical gas ions (derived from both water bath 15 and ambient air gases 19 fails to unite with or covalently link up or covalently bond with highly energized (laser primed) hydrogen atom. Sub-critical oxygen atom having less than the normal amount of covalent electrons (orbital electrons) is unable to reach "stable-state" (six to eight covalent electrons required) when the two hydrogen atoms seek to form the water molecule during thermal gas ignition.

This atomic thermal-interaction between sub-critical combustible gas atoms is, now, herein after called, "The Hydrogen Fracturing Process" which, is instantly triggered with the Quantum Kinetic Injector 10.

Technical Field: The present apparatus includes twelve components:
1. A metered dielectric consisting of water mist, oxygen and/or any non-combustible mixture under any pressure between 125 psi or higher.
2. The Quantum Kinetic Injector assembly (10)
3. Resonant Tri-Coil-Transformer (T.C.T). (20)
4. Pulsing Electronics for T.C.T. and synced Photon injection
5. High Voltage Source (500 v-40,000 v) (42)
6. Photon Laser Fiber Optics Pulsing (E.M.F. Photons 1,000 um core) (70)
7. Gas Processor Ambient Air Ionization (60)
8. Exhaust Gas Recycling (80)
9. Differential Mixing Solenoids (60)
10. Injector Gate Solenoids (50)
11. Positive Displacement Pump 12 v (21)
12. Laser Distributor (90)

TABLE 1

DIELECTRIC BREAKDOWN PER ELECTRON-VOLT POTENTIALS
INPUT TO ATOMIC OUTPUT REACTANCE:
THE QUANTUM KINETIC INJECTOR VOLTAGE FORCE

STAGE 1: (0 eV-0.001) Random orientation movements of charged particles in a relativistic space and time frame. Zero-Point Energy Vacuum random flux vibrations
STAGE 2: (0.01-3 eV) Charged particle alignment to capacitive plates i.e. Free Electrons align to Polarization Plate Zone Barriers

TABLE 1-continued

DIELECTRIC BREAKDOWN PER ELECTRON-VOLT POTENTIALS INPUT TO ATOMIC OUTPUT REACTANCE: THE QUANTUM KINETIC INJECTOR VOLTAGE FORCE

STAGE 3: (3 eV-11.8 eV) Capacitive dielectric electron cloud elongation and changing time-share rate of the electron to the positive core nucleus of the atom. Splitting water into hydrogen and oxygen with physical means
STAGE 4: (12.3 eV-12.8 eV) Ionization of hydrogen atoms within the triggering of dielectric collapsing
STAGE 5: (13 eV-110 eV) Matter conjugate polarization and deformation into closed-loop circuit in addition to transmutation principles.
STAGE 6: (120 eV-2,000 eV) Atom ionization and mild ionization E.M.F. byproducts.
STAGE 7: (3,000 eV-40,000 eV) Thermal Explosive Energy vectoring as electron extraction enhances atomic yield (GTNT) and Townsend Avalanche Effects (Neutrons)

TABLE 2

THE QUANTUM KINETIC INJECTOR FUEL GASES (1) Water Mist > (1) Released Under pressure > (1) Voltage Dissociation > (1) Heat
(2) Ionized Gas > (2) Resonant Voltages > (2) Enhances Thermal Explosive Heat (2) Jets
(3) Non-combustible Gas > (3) Regulates or Modulates Burn Speed (3) Automobile
(4) (Optional) Argon Gases for Excessive Burn Heat (4) Furnace

IV. Technical Problem

Circuit components, wire, electronics, regulators, diodes etc. have voltage limits and current limit ratings. These rating limits must be followed during operation of this device. However, there are ways to counter this. Those skilled in the art will design engineer invention to maximize circuit component ratings for optimized working parameters specifications. In addition, the timing flow rate of the injector system must be meticulously properly tuned to maintain proper thermal explosive oxidation reactions for desired industries.

Additionally, the internal combustion engine is designed for gasoline fuel burn-rates are typically around 42-cm a second. This type of fuel i.e. gasoline burn speed is 7× slower than hydrogen and oxygen burn speed. Which, hydrogen and oxygen 32 ignite with astonishing speed and power at ~324-cm a second (depending on modulated atoms between the ignition). See FIG. 7A. The solution, to a retrofit all existing technology is to recycle unburned (EGR) exhaust gases 17 back into the combustion chamber intake manifold 80 or in this case the said injector 10 assembly under direct injection methods. This takes the hydrogen burn speed of ~324-cm burn rate all the way down to 42-cm a second or even lower if desirable.

Advantageous Effects of the Invention

This is a purely physical process, so electrode walls do not erode like prior art Faraday electrolysis. The expected lifetime of the Stainless Steel T304 (metal decomposition) is 0.0001 per year. In addition, no electrolyte needs to be added to the dielectric of water to trigger the process. Just use all natural well water or rainwater in the process.

Ordinary tap water from your home or office may be utilized for thermal explosive energy attenuation, heating production and advanced modes of propulsion on demand. For a standard engine (1915 cc VW power-pant), all that this is required is approximately 6.5 uL-8.5 uL of water per engine cycle. Since, water is 2.5× more powerful than gasoline, it is now feasible to retrofit all power plants with this new technology.

In addition to the oxidation burning of hydrogen and oxygen gases, the heat displacement inside the cylinder wall causes any unburned water moisture to expand 17,000× its original volume (steam expansion) during 212-degree combustion cycles ($5^{th}$ Edition of the Essentials of Firefighting IFSTA, 2008). This innate expansion force further aids in said engine operations.

Application of the invention range from commercial transportation, industrial heating, avionics propulsion and space rocket thrusters. The technology is only limited to the imaginary that its put to work.

DESCRIPTION OF EMBODIMENTS

[the Quantum Kinetic Injector Assembly Unit]

Injector sizing may vary for determined fitment of engine type(s). But, the standard injector (1915 cc VW engine) is comprised of a Stainless Steel T304 center probe (Anode 11) with an overall O.D. diameter of 1.58-inches. The total length of the center probe 11 is 6.75-inches long. The leading edge of the tip tapers from 1.58-inches down to 0.88-inches. The 0.88-inch end allows for a 1 mm fiber optics cable 6 to slide down into the center probe. This allows for photon injection to the "Trigger Zone" 9. The total length of the tapered edge of the center probe is 1 inch. The opposite side of the probe is threaded for a standard 8/32-thread end cap. The Cathode 12 is known as the plug housing 3. This is also composed of Stainless Steel T304. While a 0.125-inch stainless steel ball 1 and spring 2 act as a diode flow stop for water fuel gas mixture(s) through passageway 1A. Note: fuel gas injection pressure must maintain between 30-40 psi per injection cycle to successfully open stainless steel ball (0.125-inch diameter) and spring (0.125-inch diameter, 0.5-inch long, I.D. 0.093-inches—McMaster Carr: 9657K266) check valve 2 for fuel delivery 18 to resonant cavity waveguide region 13 of injector. The check valve 2 also allows for constant back-pressure during off pulse firing. The plug housing 3 O.D. diameter orifice is 0.129-inches. This tapers voltage zones recedes 1 inch into the plug housing 3. This allowing proper dwell time expose to voltage zones to dissociation of water mist into combustible fuel gases. This allows for a tapering conical semi-parallel capacitive resonant waveguide construction. The plug housing 3 is end threaded (M14×1.25-inch) for standard engine block threads. This allows direct fitment to any internal combustion engine porthole and establishes electrical grounding 5. To insulate both the plug housing 3 and the center probe anode 11, there is a machined ceramic insulator called Macor (glass) 4 between the two. Quartz will also suffice along with any other ceramic insulator; however, Macor 4 (machine-able glass, 1000-degree temperature resistance) can withstand extremely high voltages. Which, makes it ideal for the operations of this invention. Since dissociated gaseous matter hydrogen and oxygen atoms only require 20-microjoules to activate detonation, the tapered waveguide focuses the ejected electrically primed gaseous matter 17, 15, 19 to a singularity point for physical detonation. Exhaust gas 17 from previous cycle are cooled and extracted using the exhaust gas reclaim device 80. Gas Processor 30 ionizes ambient air atoms 19 using the Quantum Kinetic Well phenomenon by tickling state-space with 132 v-10,000 vdc. Exhaust gases 15, ionized ambient air 19 and water droplets 15 are pulled into injectors using a differential mixing solenoid 60. Water droplets are pulled into differential solenoid by negative pressure from fuel pump 21.

Once all fuel gases are properly meter mixed by differential solenoid valve, they are sent to the injector gate solenoid assembly by positive displacement fuel pump (125 psi)—AEM 50-1009 400 LPH Inline Fuel Pump and 8AN Check value.

In accordance to operational parameters of standard internal combustion engine platforms (1915 cc VW engine), the non-combustible 15, gas ratio is 43%. While, ionized air 19 mixtures represents 32% and the water mist 15 constitutes 25% of the total differential fuel gas mixture 18. Programmed IC chips and properly timed 12 v pulse firing to differential solenoid allows proper mixture of fuel gases. See FIG. 6A.

Wherein, the rotary hall sensor or distributor cap 90 pulse fires both the electrical spark A and B unipolar pulse trains and metered ejection of fuel gases 18 to voltage zones 13 of injector 10. See FIG. 7C. Synchronized firing of gate solenoid 50 with respective injector 10 allows for instantaneous exposure to voltage zones 13.

This frictional impacting 9, which is physical in nature, much like the electrical dissociation 13, triggers thermal explosive energy 8 in a fraction of a second into the combustion engine. Optional amplification of this triggering of thermal explosive energy 8 can be enhanced using a pulse laser firing fiber optic 40 cable.

Photon excitation 7 application is accomplished using a 1,000 um plastic fiber optics cable 40 within the center probe 11. The ~1,000 um O.D. hole runs up and down the entire probe 11. This aims, and focuses the photons (Electromagnetic Waves) into the Trigger Zone 9, while allowing an insulting property and allows said photon passage. The insulating fiber optics prevents back electrical charges surges to backfire to the optic source in the form of "Induced Plasma Channeling" 35 effects. Fiber optics 7 pulse firing network is affixed to a high output IF-E97 660 nm super bright LED emitter. Note: pulse firing LED frequency should sync to unipolar 44 T.C.T. 20 resonant pulse frequency to maximize quantum electron excitation leaps within "Trigger Zone" 9. See FIG. 1D Optional construction of design consists of a fiber optic cable(s) 40 and L1 and L2 bifilar coils wrapped around the extending optics from injector 10 to the T.C.T. 20.

The injector(s) 10 are affixed to a tuned pulsing transformer, the T.C.T. 20 that allows for voltage to polarize the water molecule mist 15 in a physical force not chemical. In addition, the voltage destabilizes 13 the combustible gas mixture 18 on demand and is completely vector-able by attenuating voltage levels. The T.C.T. 20 is composed of Stainless Steel wire or magnetic copper wire. Product name Kanthal A1 allows for high resistive (stainless steel) values while allowing voltage to each highest value during operations.

[T.C.T. Connected to Injector Assembly]

A 2N6678 power transistor connected to VCC 6 and GROUND 5 state of a variable D.C. power supply 42. 2N6678 power transistors A and B respectably are connected to Tri-Coil-Transformer 20 bobbin assembly screw ports (4-40 screw size). See FIGS. 7A & 7A1. The triggered phototransistor 45, or series of opto-couplers H1D11 is triggered from a 5 volt square wave oscillator connects to ground state 5. The power supply 42 is passed through a current resisting resistor R1 (100 ohm at 10 watts) to protect the base of the 2N6678. This electrical arrangement ensures stable operations within "Closed-Loop" parameters to be met during pulsing triggering. T.C.T. 20. L1 and L2 are 30 AWG magnetic copper wire in a bifilar wrapped (top to bottom) configuration at 1,300 turns around the center bobbin. See FIG. 2A. L3 coil is also magnetic copper at 36 AWG and is wrapped 5,743 turns around outer bobbin (top to bottom). Primary coil L4 is 24 AWG magnetic copper wire wrapped around L1 and L2 at 200 turns (end to end). This coil arrangement resonates at 29 KHz frequency. Encompassing the coils L1, L2, L3 and L4 into a 14 MIL, (60 to 75) laminated sheet E and I core (GOES M6 0.014" L5) enhances the electromagnetic flux density of the Tri-Coil-Transformer (T.C.T.) 20. Resin wax may be used to insulate the coil windings as high voltage unipulses A and B are respectively fired to injector 10.

Those, skilled in the art will vary coil wrap designs to predetermined resonant frequencies to capacitive matrix and power supply inputs 42 (line output or step up fly back transformers or AC to DC converters). In addition, there are other modes of operations for this coil wrapping design, which lead to greater polarization effects. Center tapped L5 coil allows for further amp inhibiting characteristics for those skilled in the art.

Pulse A establishes primary L4 coil excitation (variable 12 v-132 v). The primary coil L4 is magnetic coupled to the secondary coil L3 to allow step-up mutual inductive voltage spikes from 500 v to 45,000 v and beyond (Cockcroft-Walton Multiplier or CRTV Voltage Silicon Tripler Kit). Increasing secondary coil turns will increase overall voltage output the capacitive plate matrix of the injector 10. See FIG. 7A. L1 coil is a frequency bypass coil, which allows instantaneous voltage perturbations to capacitive plate 11.

Pulse B harvests electrons present within the dielectric matrix (variable 12 v-132 v). This can be any form of dielectric consisting of electron pressures. In this case, fuel gas mixtures composing of water mist 15, primed ionized oxygen 16 and exhaust gases 17 for burn rate modulation (adjusting) for utilization of water as a revolutionary retrofit drive unit for all industries. See FIGS. 7A & 7A1.

Pulse A and Pulse B are continuously triggered within nano-second intervals to establish PUSH (A) and PULL (B) electrostatic plasma oscillations 35 to the voltage zones 13 per injection firing cycle. See FIG. 7A1. During normal operations the Laser Distributor 90 rotates with crankshaft position, then pulse A and pulse B (together) is relayed to respectively fired injector 10 through the energized T.C.T. 20 inductor. See 7C. Establishing and adjusting gate frequency between A pulse and B pulse will provide many respective pulse bursts per injection cycle to injectors 10. Those skilled in the art will attenuate pulses accordingly.

INDUSTRIAL APPLICABILITY

Application permits a new form of energy harvesting and management opportunities. And not limited to atomic transmutation, ionic filtration devices, water heating oscillators, energy vectoring, new ionic filtration devices, water utilization for jet propulsion, resistance restriction for aeronautic winged-or-saucer craft, Alcubierre drive systems, electrical particle generators, CO2 sequestering, Tokamak fusion reactor enhancement, hydrogen production from water, powering engines, jets, rockets and many other combustion/thruster engines.

I claim:

1. An electrolysis system, comprising:
   an injector comprising a conical tapered resonant capacitor wave-guide forming two voltage zones of polarity;
   a cylindrical anode probe retained along a central longitudinal axis of the injector having a cylindrical diameter for establishing a positive charge reaction of a capacitive voltage region;
   an anode exciter component comprising an anode end portion of the anode probe and having an anode conically tapered tip having a tapering diameter that progressively diminishes from the cylindrical diameter toward a tip end, wherein the tapering diameter determines a guide path through the injector for a mixture of water mist and fuel gases;
   a cylindrical cathode probe retained concentrically along the central longitudinal axis of the injector for establishing a negative charge reaction of the capacitive voltage region;
   a cathode exciter component comprising a cathode end portion of the cathode probe having a cathode tapered tip conically parallel with the conically tapered tip of the anode end portion, wherein the anode and cathode end portions form a compression exiting nozzle port;
   wherein the compression exiting nozzle port is configured to receive the mixture of water mist and fuel gases and to focus the mixture into a trigger zone of fuel gas combustion which triggers an electrolysis reaction in the water mist.

2. The electrolysis system of claim 1, wherein the water mist is received into the injector as 6-148 micro-liters of water droplets per injection cycle.

3. The electrolysis system of claim 1, wherein the trigger zone of the compression exiting nozzle port is a singularity point of collision 2-3 cm outside the injector.

4. The electrolysis system of claim 1, wherein the anode and cathode exciter components are composed of Stainless Steel T304 which provides conductivity and material strength to withstand oxidation reactions.

5. An electrolysis system, comprising:
   a plurality of injectors for providing an electrolysis reaction, wherein each of the plurality of injectors comprises:
      a conical tapered resonant capacitor wave-guide forming two voltage zones of polarity;
      a cylindrical anode probe retained along a central longitudinal axis of the injector having a cylindrical diameter for establishing a positive charge reaction of a capacitive voltage region;
      an anode exciter component comprising an anode end portion of the anode probe and having an anode conically tapered tip having a tapering diameter that progressively diminishes from the cylindrical diameter toward a tip end, wherein the tapering diameter determines a guide path through the injector for a mixture of water mist and fuel gases;
      a cylindrical cathode probe retained concentrically along the central longitudinal axis of the injector for establishing a negative charge reaction of the capacitive voltage region;
      a cathode exciter component comprising a cathode end portion of the cathode probe having a cathode tapered tip conically parallel with the conically tapered tip of the anode end portion, wherein the anode and cathode end portions form a compression exiting nozzle port;
      wherein the compression exiting nozzle port is configured to receive the mixture of water mist and fuel gases and to focus the mixture into a trigger zone of fuel gas combustion which triggers an electrolysis reaction in the water mist;
   wherein the electrolysis system further comprises:
      a distributor in connection with each of the anode probes and cathode probes of each injector for establishing a firing sequence for each injector,
      a tri-coil transformer (TCT) in connection with the distributor for establishing a resonance with each injector.

* * * * *